United States Patent [19]
de Groot

[11] Patent Number: 5,557,399
[45] Date of Patent: Sep. 17, 1996

[54] OPTICAL GAP MEASURING APPARATUS AND METHOD

[75] Inventor: Peter de Groot, Middletown, Conn.

[73] Assignee: Zygo Corporation, Middlefield, Conn.

[21] Appl. No.: 408,907

[22] Filed: Mar. 22, 1995

[51] Int. Cl.[6] ........................................... G01B 9/02
[52] U.S. Cl. ............................. 356/357; 356/351
[58] Field of Search ................................. 356/351, 357, 356/358

[56] References Cited

U.S. PATENT DOCUMENTS

| | | |
|---|---|---|
| 3,855,625 | 12/1974 | Garnler et al. |
| 4,593,368 | 6/1986 | Fridge et al. |
| 4,606,638 | 8/1986 | Sommargren |
| 4,762,414 | 8/1988 | Grego |
| 5,170,049 | 12/1992 | De Jonge et al. |
| 5,218,424 | 6/1993 | Sommargren |
| 5,280,340 | 1/1994 | Lacey |

FOREIGN PATENT DOCUMENTS 0075689  4/1983  European Pat. Off.

OTHER PUBLICATIONS

L-Y. Zhu et al., "Measurement Of Head/Disk Spacing With a Laser Interferometer," *IEEE Transactions On Magnetics*, vol. 24, No. 6, pp. 2739–2741, (Nov. 1988).

W. Stone, "A Proposed Method for Solving Some Problems in Lubrication," *The Commonwealth Engineer*, pp. 115–122 (Nov. 1, 1921).

R. Pavlat, "Flying Height Measurement Systems and Slider Absorption (k)," and other articles published in *IDEMA Insight*, vol. VII, No. 5, (Sep./Oct. 1994).

Y. Sato et al., "The Koyo FM2000 Fly Height Tester," *IDEMA Sub 2–Microinch Fly Height Workshop Proceedings*, pp. 31–44.

D. H. Veillard, "New Possibilities in Head–Disk Separation Movement," *IDEMA Sub 2–Microinch Fly Height Workshop Proceedings*, pp. 47–55.

C. Lacey, "A New Method for Measuring Flying Height Dynamically," *IDEMA Sub 2–Microinch Fly Height Workshop Proceedings*, pp. 59–74.

T. McMillan, "Ultra Low Flying Height Measurements Using Laser Interferometry and Fringe Intensity Determination," *IDEMA Sub 2–Microinch Fly Height Workshop Proceedings*, pp. 93–108.

G. L. Best, "Comparison Of Optical And Captive Measurements Of Slider Dynamics," *IEEE Transactions on Magnetics*, vol. MAG–23, No. 5, pp. 3453–3455, (Sep. 1987).

M. V. Mantravadi, "Chapter 1—Newton, Fizeau, and Haidinger Interferometers," *Optical Shop Testing, Second Edition*, pp. 1–48, John Wiley & Sons, Inc. (1992).

A. Nigam, "A Visible Laser Interferometer for Air Bearing Separation Measurement to Submicron Accuracy," *Transactions of the ASME*, vol. 104, pp. 60–65 (Jan. 1982).

(List continued on next page.)

*Primary Examiner*—Frank Gonzalez
*Assistant Examiner*—Robert Kim
*Attorney, Agent, or Firm*—Bryan Cave, LLP

[57] ABSTRACT

Optical method and means for high-speed measurement of the distance between two surfaces, the first of which (25) is part of a substantially transparent element (20) and the second of which (35) is part of a test object (30). In a first step, a lens (3) directs a light beam (2) through a polarizing component (4) towards the first surface at an oblique angle of incidence. In a next step, the polarized light beam (5) reflects back through the transparent element by means of the combined effect of reflections from the first surface of the transparent element and from the surface of the test object (30). In a further step, a polarization-sensitive intensity detector (12) and a phase detector (13) measure the strength and relative phase of the polarization components defined by the plane of incidence. A computer (99) then analyzes these measured parameters to determine the size of the gap between the two surfaces (25,35). An additional method and means are provided to measure the complex index of refraction of the object surface (35) by changing the gap between the surfaces (25,35).

29 Claims, 7 Drawing Sheets

OTHER PUBLICATIONS

T. Ohkubo et al., "Accurate Measurement of Gas-Lubricated Slider Bearing Separation Using Visible Laser Interferometry," *Transactions of the ASME*, vol. 110, pp. 148–155, (Jan. 1988).

G. L. Best, et al., "Precise Optical Measurement Of Slider Dynamics," *IEEE Transactions on Magnetics*, vol. MAG–22, No. 5, pp. 1017–1018 (Sep. 1986).

B. Bhushan, "Tribology and Mechanics of Magnetic Storage Devices," Springer-Verlag, pp. 765–797.

C. Lin, et al., "Real time interferometric ellipsometry with optical heterodyne and phase lock–in techniques," *Applied Optics*, vol. 29, No. 34, pp. 5159–5162 (Dec. 1990).

H. F. Hazebroek et al., "Interferometric ellipsometry," *Journal of Physics E: Scientific Instruments*, pp. 822–826, vol. 6 (1973).

T. Smith, "An Automated Scanning Ellipsometer," *Surface Science*, pp. 212–220, vol. 56, (1976).

R. F. Spanner, "Ellipsometry—A Century Old New Technique," Reprinted from *Industrial Research*, (Sep. 1975).

D. P. Pilipko et al., "Interference Ellipsometer," *8164 Instruments and Experimental Techniques*, pp. 951–952, vol. 26, No. 4, Part 2 (Jul.–Aug. 1983).

C. Lacey et al., "Interferometric Measurement of Disk/Slider Spacing: The Effect of Phase Shift on Reflection," IEEE Transactions on Magnetics, vol. 29, No. 6, pp. 3906–3908 (Nov. 1993).

L. Singher et al., "Ellipsometry with a Stabilized Zeeman Laser," Applied Optics, vol. 29, No. 16, pp. 2405–2408 (Jun. 1990).

J. M. Fleischer et al., "Infrared Laser Interferometer for Measuring Air–Bearing Separation," IBM J. Res. Develop., pp. 529–533 (Nov. 1974).

OPTICAL GAP MEASURING APPARATUS AND METHOD

FIELD OF THE INVENTION

The present invention relates to high-speed, high precision measurement of the distance between two surfaces, one of which is on a substantially transparent element. In particular, the invention relates to an apparatus and method for performing this measurement using polarized light and interferometry.

BACKGROUND AND PRIOR ART

A frequently-encountered problem in industrial inspection and quality control is the precise measurement of small distances between surfaces. In magnetic data storage systems, for example, it is required to measure the flying height of a slider assembly near contact on a rapidly rotating rigid disk in order to verify the performance of the slider assembly. The flying height, as used herein, is the distance between the magnetic head pole and the surface of the rotating rigid disk; see, e.g., M. F. Garnier, et. al., U.S. Pat. No. 3,855,625 issued Dec. 17, 1974. The flying results from the aerodynamic effects produced by the rigid disk's rotation. The flying heights are generally less than 250 nm (10μ-inch) depending on the design of the slider, and may be as close as a few tens of nanometers. The trend in the art is toward very low flying heights, that is, less than 25 nanometers. The speed and reliability of the measurement is of particular importance, since a single slider manufacturer typically produces 200,000–500,000 slider assemblies per month.

Prior-art apparatus and methods for measuring the flying height of a slider assembly are disclosed in B. Bhushan, Tribology and Mechanics of Magnetic Storage Devices, pp. 765–797 (New York: Springer-Verlag, 1990). Some more recent developments are described in "Proceedings of the IDEMA Sub 2-micro inch Workshop", May 12, 1993.

Optical flying-height testers (OFHT's) are almost invariably based on interferometry. Interferometers are capable of determining the distance to an object, the topography of the object, or like physical parameters involving physical lengths (see, for example, Chapter 1 of the book Optical Shop Testing, second edition, edited by Daniel Malacara (Wiley, New York, 1992). One of the fundamental difficulties of optical techniques is that the interface between the slider ABS and a real hard disk cannot be inspected directly. Therefore, there are essentially two different types of OFHT's, those which perform a relative measurement the back side of the slider flying on a real disk, and those that use a transparent glass surrogate in place of a real hard disk.

An example of the first kind of OFHT is provided in an article entitled "Measurement of head/disk spacing with a laser interferometer," by L.-Y. Zhu, K. F. Hallamasek, and D. B. Bogy (IEEE Tran. Magn., MAG-23, 2739, 1988). The disclosed apparatus is a heterodyne interferometer capable of measuring the physical position of a plurality of points on the back side of a slider, that is, points on the side of the slider that is not in near contact with the disk. The advantages of this apparatus are that it functions with a real magnetic hard disk, and it is capable of measuring the orientation (pitch and roll) as well as the height of the slider in flight. Calibration for zero flying height is performed by landing the slider on the disk. The principle disadvantage of this kind of system is that the slider/disk interface is not observed directly, and the flying height can only be inferred from the position of the back side of the slider. Thus it must be assumed that the slider thickness and ABS shape are constant, while in fact there may be significant distortions of the slider due to mechanical and thermal stress during flight. Another disadvantage is that the back of the slider is currently not accessible on most production slider assemblies.

The first reported direct measurement of the slider/disk interface by interferometric means was reported by W. Stone in an article entitled "A proposed method for solving some problems in lubrication" (The Commonwealth Engineer, November, 1921 and December, 1921). Stone was obviously not working with magnetic storage media in 1921, but the essential concepts are the same ones that underlay the majority of modern OFHT's. Stone's apparatus comprises a glass disc about 125 mm in diameter so mounted that it can be rotated in a horizontal plane. A 15 mm-square block, substantially similar in function to a slider, is pressed against the lower surface of the disc by means of a suitable loading mechanism. Since the disk is transparent, it is possible to view the block through the disk while it is in flight. The block is illuminated through the disk with a sodium flame, which for the intended purpose acts as a nearly monochromatic, unpolarized light source. The reflected beam is composed of a combination of the light beam reflecting from the surface of the disk and the light beam reflecting from the block. The combination and simultaneous detection of these two reflected beams results in an interference effect related to the flying height of the block above the disk. The spacing between the block and the disk as well as the orientation of the block is deduced by visual inspection of the interference pattern as the disk varies in speed.

Modern commercial OFHT's that measure the slider/disk interface directly are based on many of the same physical principles as the apparatus invented by Stone, with the differences being principally in the type of source, detector and data processing means. A transparent surrogate disk replaces the magnetic hard disk and the interference effects at the slider ABS provide the flying height information. All prior-art OFHT's of this type illuminate the ABS through the disk at substantially normal incidence, and detect the variations in reflected intensity irrespective of polarization.

One form of OFHT uses a substantially monochromatic source light, as disclosed for example by G. L. Best, D. E. Horne, A. Chiou and H. Sussner, in a paper entitled "Precise optical measurement of slider dynamics," IEEE Trans. Magn. MAG-22, (1986) 1017–1019. The reflected light is modulated by the thin-film effect between the disk and the slider ABS. This modulation is periodic with the flying height, and has a period equal to one-half the wavelength of the source illumination. By introducing appropriate detection and analysis means, it is possible to track variations in the flying height by observing the modulations in intensity of the reflected light. Over certain portions of the modulation curve, it is possible by detection of the reflected intensity to determine the gap between the ABS and the disk with reasonable accuracy. Originally, such instruments involved a purely visual interpretation of the fringes. J. M. Fleischer and C. Lin were the first to use a photo-electric sensor in a monochromatic OFHT, as is described in an article entitled "Infrared laser interferometer for measuring air-bearing separation," (IBM Journal of Research and Development, 18(6), 1974, pp.529–533). A more modern example of monochromatic OFHT is described by T. Ohkubo and J. Kishegami in an article entitled "Accurate Measurement of Gas- Lubricated Slider Bearing Separation using Laser Interferometry," Trans. ASME, Vol 110, pp148–155 (January, 1988). This article describes the basis of operation for the FM8801 and FM2000 Fly Height Testers sold in the U.S.A. by ProQuip, Inc.

In that the measurement depends on a periodic phenomenon, a disadvantage of the monochromatic OFHT is that it is not clear which interference cycle is being measured. There is consequently an ambiguity and the flying-height measurement is restricted to a range equal to one-quarter of the wavelength, i.e. typically less than 150 nm. A further difficulty is that there are significant ranges of flying height over which the sensitivity of the measurement is nearly zero. This aspect of the measurement method is particularly troublesome when the gap between the slider and the disk is less than 25 nm Finally, it may be necessary to land every slider in a production test to calibrate the system for zero flying height.

In the paper entitled "A Visible Laser Interferometer for Air Bearing Separation measurement to Submicron Accuracy," by A. Niagam, Trans. ASME, Vol. 104, pp. 60–65 (1982) there is described an OFHT based on monochromatic light which also provides additional means of determining the interferometric fringe order. The additional means comprise a Xenon lamp and a circular variable wavelength filter. The lamp and wavelength filter function together as a tunable wavelength source with a range of 400 to 700 nm. As the wavelength is shifted, the interference pattern is also shifted in a way which reveals the absolute flying height and thus the fringe order for the monochromatic measurement. Once the fringe order has been determined, the measurement proceeds with the monochromatic sensor at a rate of approximately 2.5 kHz.

Several other prior-art systems avoid the ambiguity problems of monochromatic interferometry by including multiple wavelengths. For example, a common form of OFHT is based on the variation of the interference effect with the wavelength of the illumination, as is taught for example in the U.S. Pat. No. 4,593,368 to D. A. Fridge, et al. The apparatus in this patent comprises a computerized spectrophotometer, which analyzes the wavelength-dependent modulation of white light reflected from the slider-disk interface. This technique is incorporated in commercially available products such as the line of Automatic Digital Flying Height Testers formerly produced by Pacific Precision Laboratories, Inc. (PPL) of Chatsworth, Calif. White light interferometry has the significant advantage that there is no ambiguity in the measurement, since the spectral modulation phenomenon is not periodic with flying height. However, white light methods based on spectrometers suffer from a number of limitations, the most severe and intractable limitation being the measurement speed. This problem is compounded by the need to compensate for the phase change on reflection for as many as 171 different wavelengths (see, for example, an article entitled "Flying height measurement systems and slider absorption", by R. Pavlat, IDEMA Insight 7(5), p.1 (1994)). Finally, white light techniques are most effective for gaps greater than one-half the wavelength of the shortest wavelength used, i.e., approximately 200 nanometers, whereas the trend is towards flying heights of less than 25 nm.

In order to overcome some of the limitations of white light interferometry mentioned above, several prior-art OFHT's use a small number of discrete wavelengths of light to improve speed and performance. In the U.S. Pat. No. 5,280,340 to C. Lacey there is described a three-wavelength method of optically analyzing small spacings that comprises a high-intensity source of multiple-wavelength radiation and a detector assembly for rapid spectral analysis. The detector assembly includes wavelength discriminating beamsplitters, a filter for each individual wavelength to be measured and a high speed photodetector for each wavelength. The disclosed apparatus also comprises a mechanical assembly which is used to move the head away from the detection assembly a very small distance, on the order of 0.25 µm. This mechanism is required for calibration of the apparatus, which involves measurement of the intensity of two or more wavelengths while partially unloading the slider to determine the maximum and minimum intensity at each wavelength. Once the system is calibrated, it is capable of measuring flying heights at rates greater than 100 kHz. The apparatus disclosed in this patent is the basis of the Dynamic Flying Height Tester manufactured by Phase Metrics.

Although three-wavelength OFHT's are much faster than older white-light instruments, they still share many of the same limitations, the most serious of which is that the measurement sensitivity approaches zero as the flying height approaches zero. These limitations are related principally to the reliance on the variation in reflected intensity at normal incidence for a range of wavelengths. These variations can be extremely difficult to measure when the flying height is small. Therefore the reliance on intensity measurements at normal incidence is a fundamental deficiency of all of the prior-art OFHT's cited above.

The measurement difficulty at low flying heights is largely avoided if the reflection from the slider ABS and the reflection from the disk surface can be separated in some way, either by polarization, physical separation of the beams, or both. The apparatus disclosed in commonly-owned U.S. Pat. No. 4,606,638 to G. Sommargren uses a transparent disk as a front surface polarizer, so that the reflection from this surface can be distinguished from the reflection from the ABS. An additional advantage of the disclosed apparatus is that the entire gap is measured by a camera having a plurality of detectors, thus making it possible to determine the shape and orientation of the slider, as well as other parameters of interest that require a plurality of measurement points. However, the manufacture of the special transparent disk with the polarization coating, as taught in the Sommargren patent, is very costly and any surface imperfections can cause problems at low flying height.

Another approach to separating the interfering beams in an optical flying-height tester is disclosed in commonly-owned U.S. Pat. No. 5,218,424 to G. Sommargren. The apparatus uses two parallel beams having orthogonal polarizations. Both beams are incident on the surface of the glass disk at Brewster's angle, so that one of the beams passes completely through the disk without reflection, and the other is partially reflected from the surfaces of the disk. The beam that passes through the disk without reflection is used to illuminate the ABS The two beams are then recombined, resulting in an interference effect that varies sinusoidally with the flying height. Since the apparatus taught in this patent is a two-beam interferometer, it is possible to measure extremely small gaps without loss of sensitivity and precision, thus eliminating one of the principle disadvantageous of systems that depend on interference effects resulting directly from multiple reflections within the gap. The disclosed apparatus also comprises an array camera for imaging the entire ABS.

Despite these advantages, the method and apparatus disclosed in commonly-owned U.S. Pat. No. 5,218,424 has significant limitations that make it an impractical tool for automated inspection of the flight characteristics of sliders used in the magnetic storage industry. These limitations include the use of an expensive, complicated, high-speed phase modulator as an essential component; a very slow data acquisition and processing rate of approximately 15 Hz, which is due in part to the method of phase modulation and the need to integrate over a full rotation of the transparent disk; a very slow determination of the dynamic flight characteristics of the slider, which is due in part to the use of a full-frame imaging camera for all measurements; a deleterious sensitivity to inhomegeneaties and distortions in the transparent disk; a deleterious sensitivity to the tip and tilt of the disk, which can introduce substantial errors in the flying height measurement; and an overall drift in the interference phase due primarily to the presence of the high-speed phase modulator, resulting in an ambiguous phase offset.

Several of the deficiencies of the apparatus disclosed in commonly-owned U.S. Pat. No. 5,218,424 are addressed in copending U.S. patent application Ser. No. 08/38/232, dated Jan. 31, 1995, entitled "Interferometer and Method for Measuring the Distance of an Object Surface with Respect to the Surface of a Rotating Disk". The principle improvements taught in this copending Patent Application are the following: incorporation of compensation beams that permit high-speed operation without suffering from unwanted details concerning the variations in volume, surface profile and orientation of the disk; a high-speed phase measuring system; and a method and means for efficiently sampling the phase at a plurality of points corresponding to various positions on the slider surface at very high speed. Despite these advantages, the apparatus in this copending U.S. patent application Ser. No. 08/38/232 is still sensitive to some sources of phase drift, such as air turbulence and mechanical motion of the optical elements. Most seriously, it is excessively complicated and expensive.

In addition to the aforementioned significant disadvantages of known methods of flying height testing, another difficulty suffered by all prior art methods is the phase change that occurs at the slider surface upon reflection. The phase change can easily be misinterpreted as a change in flying height, resulting in errors as large as 20 nm. To correct for this effect, we must know the phase change exactly, using a priori knowledge of the complex index of refraction of the material. If the OFHT uses multiple wavelengths, then the complex index of refraction must be independently measured at each one of these wavelengths. See for example, the article entitled "Interferometric measurement of disk/slider spacing: The effect of phase shift on reflection," by C. Lacey, R. Shelor, A. Cormier (IEEE Transaction on Magnetics). The need for an independent measurement of the index of refraction places a significant burden on all prior-art methods and means for optical flying-height testing.

Most often, the index of refraction is measured by a separate instrument known in the art as an ellipsometer. Ellipsometers analyze the change in polarization of a beam reflected at an oblique from the surface of the material being tested. The geometry of this measurement is very different from all prior art flying-height measurement geometries, so a completely separate instrument is needed. According to the article "ellipsometry, a century old new technique," by R. F. Spanier (Industrial Research, September, 1975), an ellipsometer is an assembly of polarizers, retardation plates and detectors designed to measure the change in polarization of a light beam incident upon a test surface at an oblique angle. Ellipsometers provide information about the complex index of refraction of a surface, and can also provide information about multilayered media, such as thin films deposited on a substrate. Commercial ellipsometers include those manufactured by Gaertner Scientific Corporation in Chicago, Ill.

Although the prior art provides several examples of experimental ellipsometers, including several designed for high-speed mesurement of the complex index of refraction, none of these instruments are designed for optical flying-height testing or like measurements of small gaps. Therefore, the determination of the complex index of refraction is a separate task from the gap measurement.

For example, in an article entitled "an automated scanning ellipsometer," by T. Smith (Surface Science 56, 212–220 (1976)), there is described an ellipsometric apparatus that has no moving parts. The light is incident upon a test surface at an oblique angle. Two beam splitters are disposed to sample spatially disparate portions of the reflected beam. One of the beam splitters separates out the polarizations perpendicular and parallel to the plane of incidence, whilst the other is placed at a 45° angle with respect to the plane of incidence. The various beams are measured by photodetectors, and data processing based on a system of three mathematical formulas provides the appropriate ellipsometric parameters for characterizing the surface under test. Although the disclosed apparatus can function at high speed, it is unsuited to the task of measuring small gaps such as those encountered in optical flying height testing. A significant problem is the spatial sampling of the beam, which introduces errors and prevents its use with focused beams, even with the introduction of additional lenses and like focusing elements. Further, no method is taught in the article for high-speed, high precision measurement of the distance between two surfaces, one of which is on a substantially transparent element. Finally, no method is taught for determining the complex index of refraction of a surface separated from another surface by a small gap, such as a slider ABS flying in close proximity to a transparent disk. Therefore, the apparatus described by Smith does not solve the problem of independent measurement of the gap and of the complex index of refraction.

Some high-speed ellipsometers use heterodyne interferometry to generate signals. In an article entitled "interferometric ellipsometry" by H. F. Hazebroek and A. A. Holscher (J. Phys. E: Sci. Instrum. 6, 822–6 (1973)) there is described a specialized double-pass ellipsometer based on a Michelson interferometer and a scanning retroreflector. The test surface is placed together with a plane mirror in one arm of the interferometer, and the retroreflector is in the other arm. The scanning retroreflector generates beat-frequency signals for two orthogonal polarizations in the interferometer. These signals are measured photoelectrically, and their relative phase and amplitude provide the appropriate ellipsometric constants. A somewhat different arrangement for interferometic ellipsometry is described by C. Lin, C. Chou, and K. Chang in an article entitled "Real time interferometric ellipsometry with optical heterodyne and phase lock-in techniques." This article discloses an optical heterodyne technique involving a Mach-Zehnder geometry and two acousto-optic modulators to generate the beat-frequency signal. However, neither one of these heterodyne ellipsometers are designed for high-speed, high precision measurement of the distance between two surfaces, one of which is on a substantially transparent element. Also, no method is taught in these articles for determining the complex index of refraction of a surface separated from another surface by a small gap, such as a slider ABS flying in close proximity to a transparent disk. Therefore, neither the apparatus described by Hazebroek and Holscher nor that described by Lin solves the problem of independent measurement of the gap and of the complex index of refraction.

Yet another form of interferometric ellipsometer employs a Zeeman laser. The type disclosed in an article by L.

Singher, A. Brunfeld and J. Shamir entitled "ellipsometry with a stabilized Zeeman laser" involves manual rotation of an analyzer, and so is not strictly a high-speed device. The type disclosed in U.S. Pat. No. 4,762,414 to G. Grego generates heterodyne signals, but is only capable of measuring one polarization at a time, and suffers from the additional difficulty that the reference leg of the interferometer must be protected from mechanical and thermal effects. These apparatus are therefore unsuited to the high-speed, high precision measurement of the distance between two surfaces, such as is required for optical flying-height testing.

A particularly unusual form of interferometric ellipsometer involving multiple passes across the test surface is described in the article "interference ellipsometer" by D. P. Pilipko and I. P. Pugach (Instruments and Experimental Techniques 26(4) 951–952 (1984)). The disclosed apparatus is based on a scanning Fabry-Perot interferometer. The unusual multiple-pass geometry simplifies some stages of signal processing for extracting ellipsometric data. However, the apparatus and method are particularly unsuited to the measurement of the distance between two surfaces, such as is required for optical flying-height testing.

Some forms of ellipsometer are only suited to a particular task or kind of surface. For example, U.S. Pat. No. 5,170,049 describes a specialized ellipsometer for the sole purpose of measuring the thickness of a chromic oxide coating on a chromium layer on a substrate. Another example of a specialized interferometric ellipsometer is disclosed in European Patent No. EP0075684 A1 to J.-C. Chastang, W. W. Hildenbrand and M. Levanoni. This system measures only the strength of two orthogonal polarizations and is therefore highly sensitive to small measurement errors and does not function at all at an incident angle of 45°. Clearly neither one of these prior art techniques suggests a solution to the problem of small gaps such as are encountered in optical flying height testing, nor do they suggest a method for avoiding independent measurement of the flying height and of the complex index of refraction of the slider ABS.

It may be concluded, therefore, that the prior art does not provide any method or means of measuring flying height without relying on a separate measurement of the complex index of refraction. Therefore a principle difficulty in OFHT's and like gap-measuring instruments is that the determination of the complex index of refraction is an independent task from the gap measurement, involving an ellipsometer or like apparatus. This requirement significantly contribues significant cost and complexity to the measurement of small gaps, while at the same time it reduces the level of confidence in the result.

There is therefore an unmet need for an apparatus and method for high-speed, high precision measurement of the distance between two surfaces, such as is required for optical flying-height testing. Some of the difficulties which have occurred in the prior art include the inability to measure extremely narrow gaps, i.e. down to contact, the required use of multiple wavelengths and the associated complexity in the source and detector components, the sensitivity of some methods to air currents and mechanical distortions, and the need to determine the complex index of refraction independently with an ellipsometer. These disadvantages are overcome by the present invention.

SUMMARY OF THE INVENTION

The invention provides a means and method for the high-speed, high precision measurement of the gap between two surfaces. One surface, referred herein as the first surface, is on a substantially transparent element, and the other surface is the surface of the object under test. The two surfaces are separated by a transparent medium, such as air, and the gap between them is typically less than one wavelength of the light used. The surface of the object under test can be in close proximity to the surface of the transparent element, such as in-contact or nearly in-contact with the first surface of the transparent element. In addition, the surface of the object under test may be either static or moving relative to the first surface of the transparent object.

In one embodiment of the invention, a polarized light beam is directed towards the first surface of the transparent element at an oblique angle. The plane of incidence of the beam defines a polarization basis vector p, to which is associated an orthogonal basis vector s. The polarization of the incident light beam is such that both s- and p-type polarizations are present.

The light beam is reflected back through the transparent element by means of the combined effect of reflections from the first surface of the transparent element and from the surface of the object under test. The two polarizations, s and p, in the reflected light beam are then caused to interfere with each other on a photodetector or combination of photodetectors, in such a way as to provide information about the relative phase of the two reflected polarization components as well as their amplitudes. In a method of the invention, this information is provided by dividing the reflected beam into two or more identical beams, each of which passes through a polarizing optical element and then onto a photodetector. Electronic processing means then calculate the amplitudes and relative phases of the two polarizations using the signals from the photodetectors. A computer then calculates the gap size using the information provided by the interferometric analysis.

The invention also provides a method and means for determining the complex index of the surface under test. The method involves varying the gap between the first surface of the transparent element and the surface under test over a range approximately equal to or greater than the wavelength of the source light. The variation may be effected either by a mechanical means for adjusting the position of the surface under test, or by varying some other physical parameter that controls the dimension of the gap. While the gap is being varied, the interferometric data is acquired at high speed, and the computer stores the maximum and minimum values for the amplitude and phase information. The computer then calculates the effective complex index of refraction of the surface under test using these maximum and minimum values.

The invention also provides a means and method for measuring the position of the measurement beam on the surface under test relative to the boundary of the surface under test to provide meaningful, repeatable gap measurements. The monitoring apparatus comprises a light source, which may be an incandescent bulb or the like, an optical microscope, an electronic camera, and means for generating an image from the camera signals. The light is directed through the microscope towards the transparent element substantially at normal incidence, in a manner familiar to those skilled in the art of bright-field microscopy. The light reflected from the first surface of the transparent element and from the surface under test is imaged onto the camera. At the same time, a portion of the aforementioned measurement light beam, which is incident at an oblique angle, is scattered by the surface under test up towards the microscope and is also imaged onto the camera. In this way, the monitoring apparatus shows the position of the measurement spot with respect to the boundary of the surface under test.

The above set forth and other features of the invention, including computational procedures, details of preferred embodiments and methods of implementation, are made more apparent in the ensuing Detailed Description of the Invention when read in conjunction with the attached Drawings.

BRIEF DESCRIPTION OF THE DRAWINGS

In the drawings, wherein like reference characters denote similar elements throughout the several views.

DETAILED DESCRIPTION OF THE INVENTION

Figure 1:
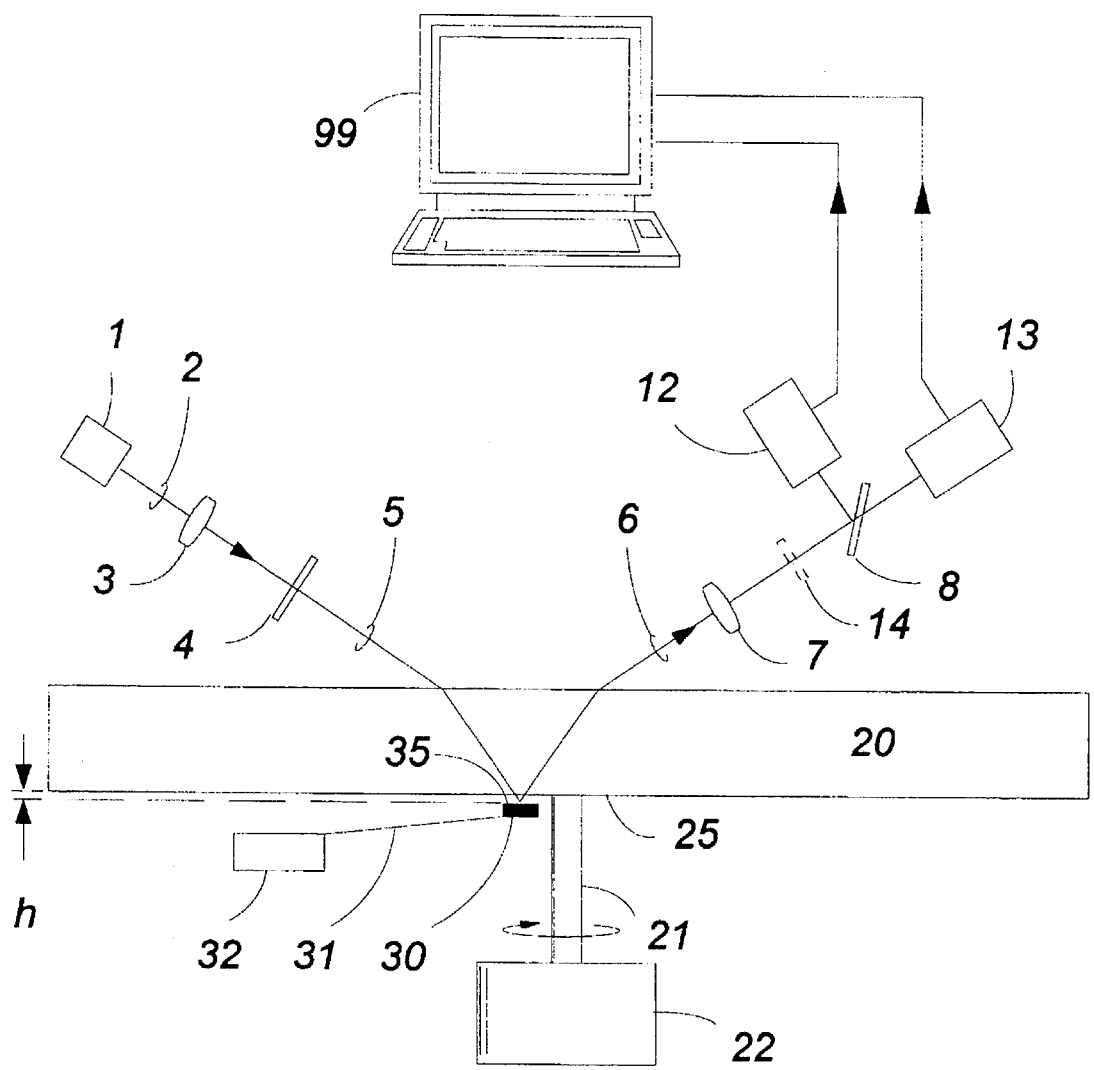
FIG. 1 is a drawing showing a preferred embodiment of the invention setup to measure the distance of a flat object surface with respect to the surface of a rotating transparent disk.
Figure 2:
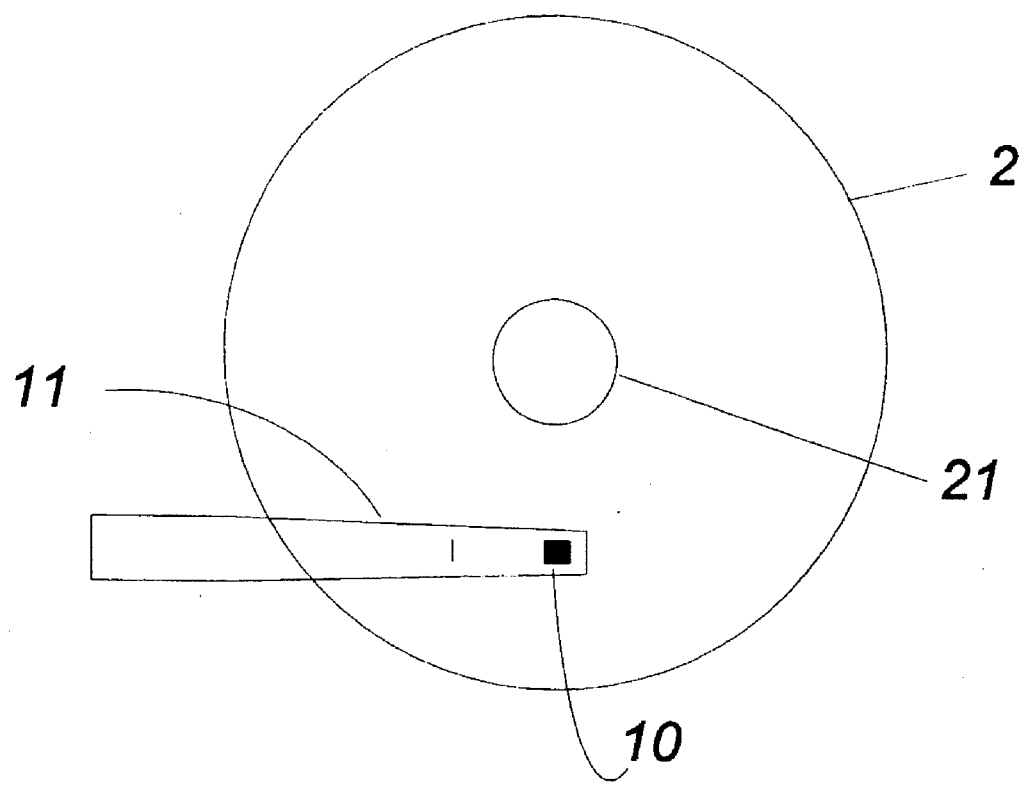
FIG. 2 is a drawing showing the disk portion of FIG. 1 from the top, indicating the positions of the object and of the various measurement points in the embodiment of FIG. 1.

FIG. 1 shows a preferred embodiment of the invention employing an interferometer setup for measuring the distance of an object 30 surface that is nearly in contact with a rotating transparent disk 20. The apparatus in this embodiment is preferably suited to the prediction of the aerodynamic flight characteristics of a conventional slider 30 over the surface of a rotating magnetic storage medium 20. The present invention preferably measures the gap between a surface 25 of a rotating transparent disk 20 and a surface 35 of a test object 30. Disk 20 is shown preferably attached to a spindle 21 driven by a motor 22, so the size of the gap may be determined as a function the speed of rotation of disk 20. The position of test object 30 with respect to spindle 21 may be further clarified by reference to FIG. 2, which shows the disk 20 as viewed from the top, indicating the position of the test object 30.

Referring now to FIG. 1, the illumination for the measurement is preferably provided by source 1, which may be a light-emitting diode, a laser diode, a gas laser, a discharge lamp or like source of light. A lens 2 preferably directs the light beam 3 through a polarizing element 4, which may for example be a dichroic linear polarizer. Polarized light beam 5 preferably propagates towards the first surface of disk 20 at an oblique angle. The plane of incidence of the beam preferably defines a polarization basis vector p, to which is associated an orthogonal basis vector s. Preferably the polarization of light beam 5 is such so that both s- and p-type polarizations are present.

Light beam 5 is preferably reflected back through disk 20 as a light beam 6, as shown in FIG. 1. Reflected light beam 6 is the result of combined reflections from surface 25 of disk 20 and from surface 35 of test object 30. The combined reflectivity of the two surfaces 25, 35 depends on the polarization state of beam 5, resulting in a change in the relative phases of the two polarizations s and p, as well as a change in the amount of light in each polarization. These changes are a function in part of the separation between surfaces 25 and 35. The apparatus of the present invention preferably further comprises a polarization-sensitive intensity meter 12 for measuring the amount of light in each polarization, as well as phase detector 13 for determining the difference in phase between the s and p polarizations. The preferred embodiment of the present invention also preferably includes a removable polarizing element 14, which may be a polarizer or a waveplate, for the purpose of calibrating and verifying the correct operation of intensity meter 12 and of phase detector 13, shown in greater detail in FIG. 3.

Figure 3:
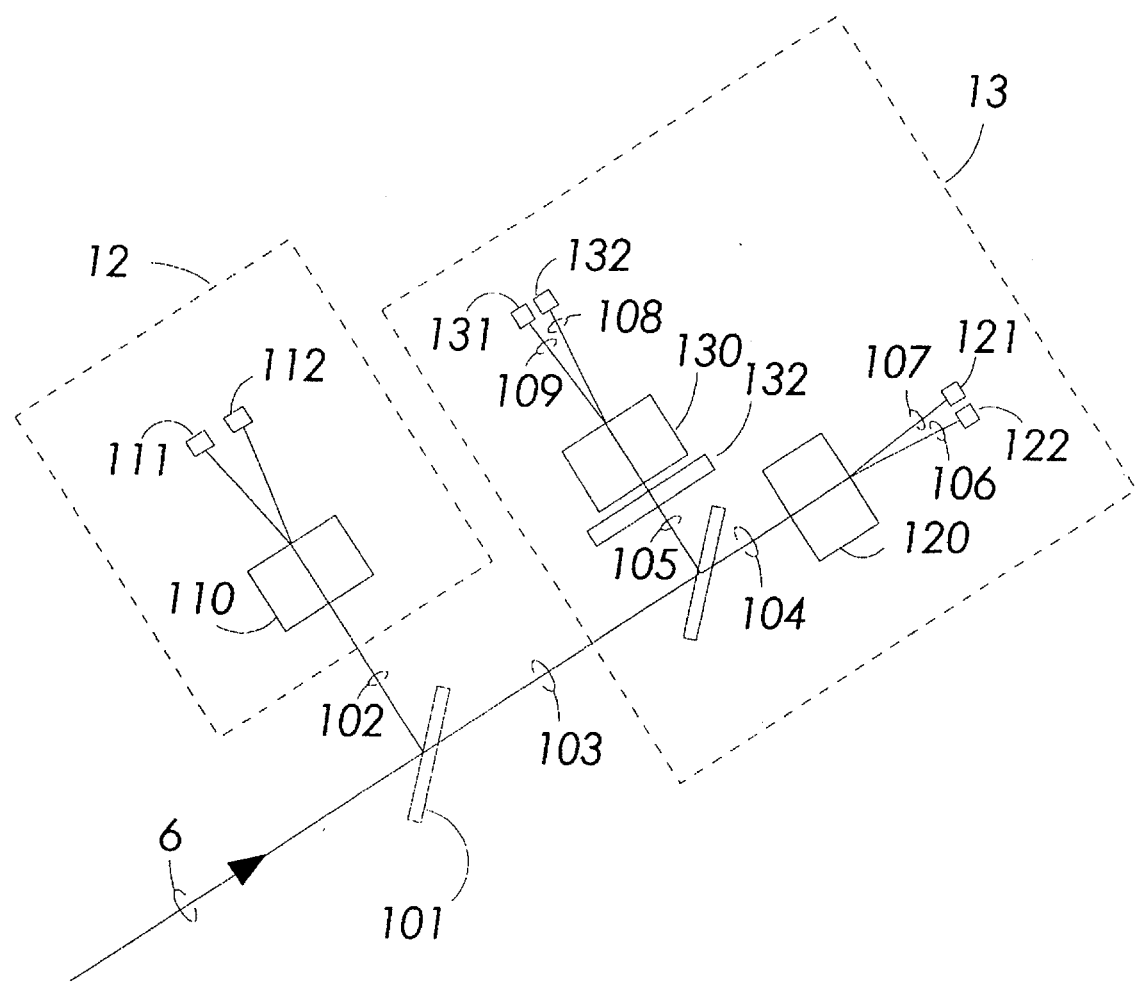
FIG. 3 is a drawing showing a preferred embodiment of the intensity and phase detector assemblies employed in the embodiment of FIG. 1.

As shown and preferred in FIG. 3, a beam splitter 101 divides reflected light beam 6 into two beams 102 and 103. The intensity meter 12, as depicted in FIG. 3, preferably includes a polarizing element 110, such as a Wollaston prism or a polarizing beam splitter, which separates the two polarizations s and p of beam 102 and directs them towards two photodetectors 111 and 112. The intensity measured by these photodetectors is preferably transmitted electronically to a conventional computer 99 (shown in FIG. 1).

Referring now to phase detector 13, illustrated in greater detail in FIG. 3, beam 103 is preferably further divided into two beams 104 and 105. A polarizing element 120, which may also be a Wollaston prism or the like, is oriented so as to mix the two polarizations s and p of beam 105 into two beams 106 and 107 orthogonally polarized with respect to each other. The mixing of the two polarizations by polarizing element 120 preferably results in an interference effect characteristic of the relative intensities of the two polarizations, the relative phase between the two polarizations, the exact orientation of polarizing element 120, as well as other factors of lesser interest. The intensity of beams 106 and 107 are preferably measured by two photodetectors 121 and 122, whose electrical signals are sent to a computer 99 (shown in FIG. 1).

Beam 105 preferably passes through a waveplate 123, which may, for example, be a quarter-wave plate. The effect of waveplate 123 is to preferably shift the relative phase of the two polarizations s and p. A third polarizing element 130, which may also be a Wollaston prism or the like, is preferably oriented so as to mix the two polarizations s and p of beam 105 into two beams 108 and 109 orthogonally polarized with respect to each other. The mixing of the two polarizations by polarizing element 130 also preferably results in an interference effect characteristic of the relative intensities of the two polarizations. The intensity of beams 108 and 109 are preferably measured by two photodetectors 131 and 132, whose electrical signals are also sent to the computer 99 (shown in FIG. 1).

It will be appreciated by those skilled in the art that detectors 111,112,121,122,131,132 may each be individual detectors, or linear array detectors, or two-dimensional array detectors. Those skilled in the art will also appreciate that alternative detection means may be used without departing from the spirit of the invention. For example, although the present detailed description of the Invention describes a particular form of phase detector comprising polarizing elements and multiple detectors, alternate forms of phase detector may be substituted. One alternative phase-estimation technique suitable for the method of the present invention is heterodyne interferometry, as described on pp.70,71, 73,189 of the book "Basics of Interferometry" by P. Hariharan (Academic Press, Boston, 1992).

Figure 4:
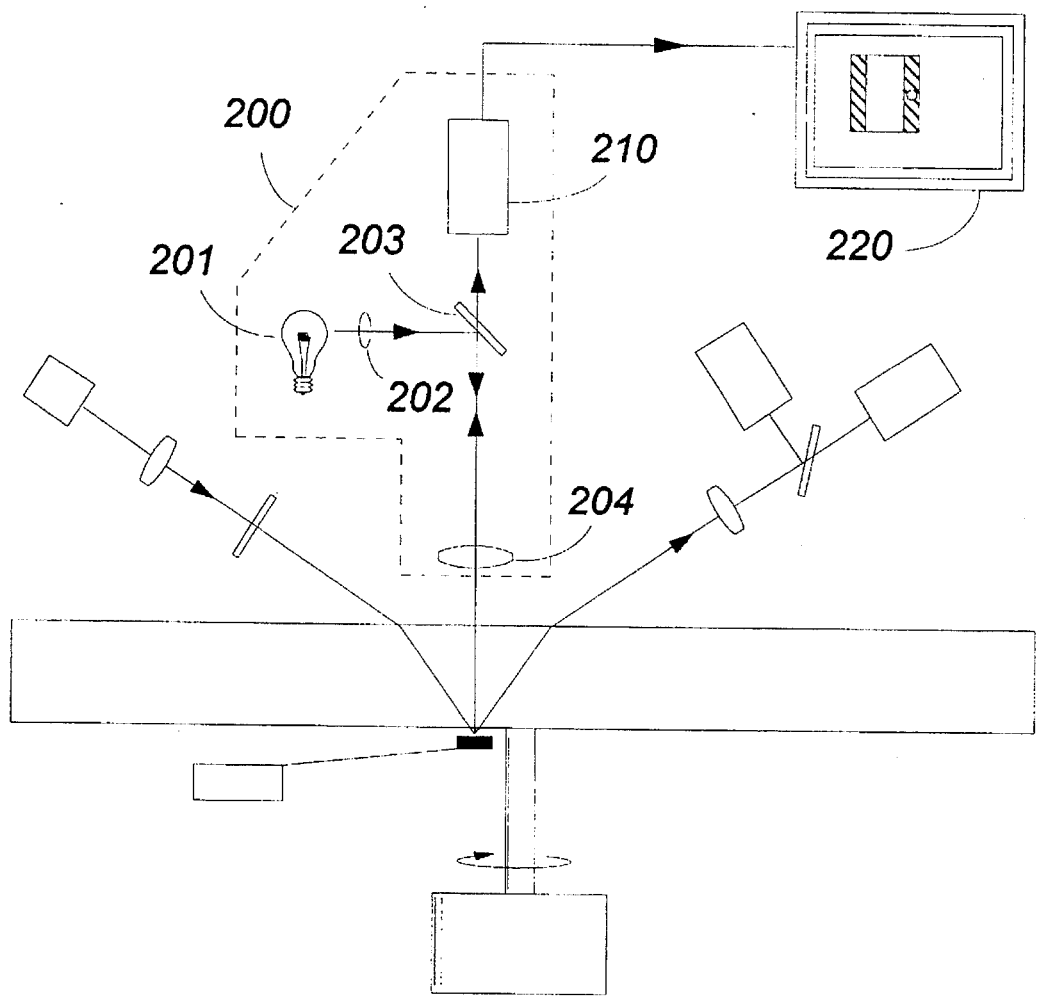
FIG. 4 is a drawing showing an alternative embodiment of the invention shown in FIG. 1 illustrating the placement of a viewing microscope for the purpose of determining the measurement position on the surface under test.

FIG. 4 is a drawing depicting an alternative embodiment of the present invention in which a microscope 200 has been added for the purpose of observing the test object and determining the position of the measurement point on the surface under test. Referring now to FIG. 4, a beam splitter 203 in microscope 200 preferably directs a light beam 202 emitted by a source 201 through a lens 204. Beam 202 is preferably reflected back through lens 204 and impinges upon the sensitive area of a closed-circuit television camera 210. The electronic image generated by camera 210 may be viewed on a monitor 220 or sent to the computer 99 (shown in FIG. 1) for further processing.

Those skilled in the art will appreciate that alternative means and methods are possible for observing the test object and determining the position of the measurement point on the surface under test. In particular, the illumination and electronic imaging may share several of the optical componenents shown in FIG. 1, such as lenses 3 and 7. In such an embodiment, the illumination and imaging would occur at oblique angles, rather than at normal incidence, as shown in FIG. 4.

Having now described a preferred embodiment of an apparatus in accordance with the present invention, a description of a preferred method of measurement in accordance with the present invention will now be provided. Referring again to FIG. 1, polarized beam 5 preferably illuminates test object 30 through disk 20 at an incident angle $\phi \ne 0$. Preferably beam 5 may be decomposed into two orthogonal polarization components p and s, where p refers to the component parallel to the plane of incidence. The electric field vector for beam 5 may therefore be represented by the expression

$$\vec{E}^{(0)} = a_s \hat{s} + a_p \hat{p} \tag{1.}$$

where $\hat{s}$ and $\hat{p}$ are unit vectors for the two polarizations. Reflected beam 6 may then be represented by the expression $$\vec{E} = z_s a''_s \hat{s} + z_p a''_p \hat{p} \tag{2.}$$

where $z_{s,p}$ are the effective reflectivities of the slider-glass interface, and the field components $a''_{s,p}$ include the effect of the double-pass transmission through the upper surface of the glass, as well as the effects of any other optical components that have a polarization dependence. The effective reflectivities $z_{s,p}$ are given by the expressions $$z_p(\beta) = \frac{r_p + r_p' \exp(i\beta)}{1 + r_p r_p' \exp(i\beta)}, \tag{3.}$$

$$z_s(\beta) = \frac{r_s + r_s' \exp(i\beta)}{1 + r_s r_s' \exp(i\beta)} \tag{4.}$$

where the phase term $\beta$ is given by the expression $$\beta = 2kh \cos(\phi). \tag{5.}$$

The reflectivities $r_{s,p}$ are for surface 25 of disk 20, while $r'_{s,p}$ refer to surface 35 of test object 30. The phase p depends on the wavenumber $k=1/\lambda$, the angle of incidence $\phi$ and the distance h between surfaces 25 and 35.

Now referring once again to FIG. 3, reflected beam 6 is analyzed by intensity meter 12. Photodetectors 111,112 measure intensities that may be represented by the expression $$I_{s,p}(\beta) = A''_{s,p} Z_{s,p}(\beta), \tag{6.}$$

where $$A''_{s,p} = |a''_{s,p}|^2 \tag{7.}$$

$$Z_{s,p} = |z_{s,p}|^2. \tag{8.}$$

Figure 5:
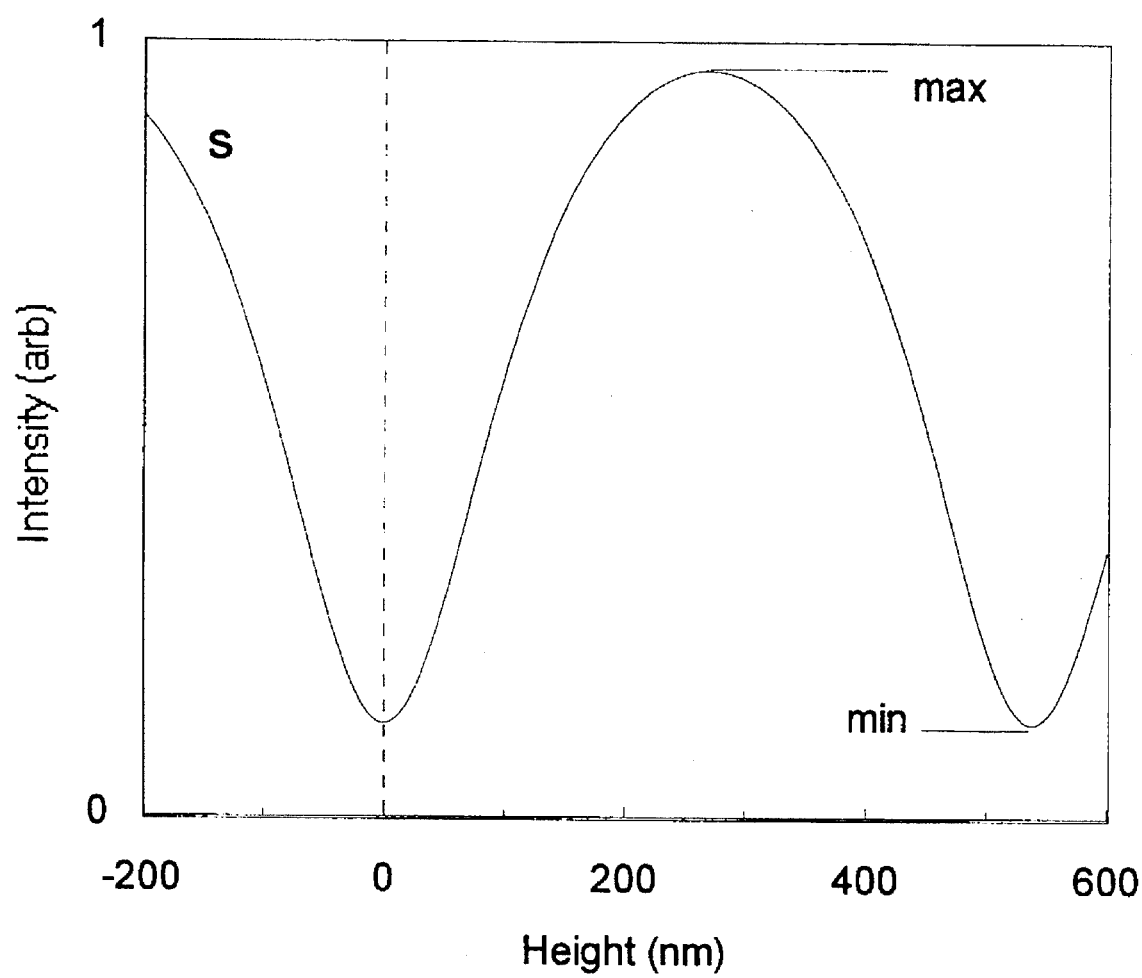
FIG. 5 is a graph showing the variation in the intensities for the s-polarization as a function of the size of the distance between two surfaces for $\phi=54°$, $n_g=1.55$, $n'=2.5$, $\lambda=633$ nm.
Figure 6:
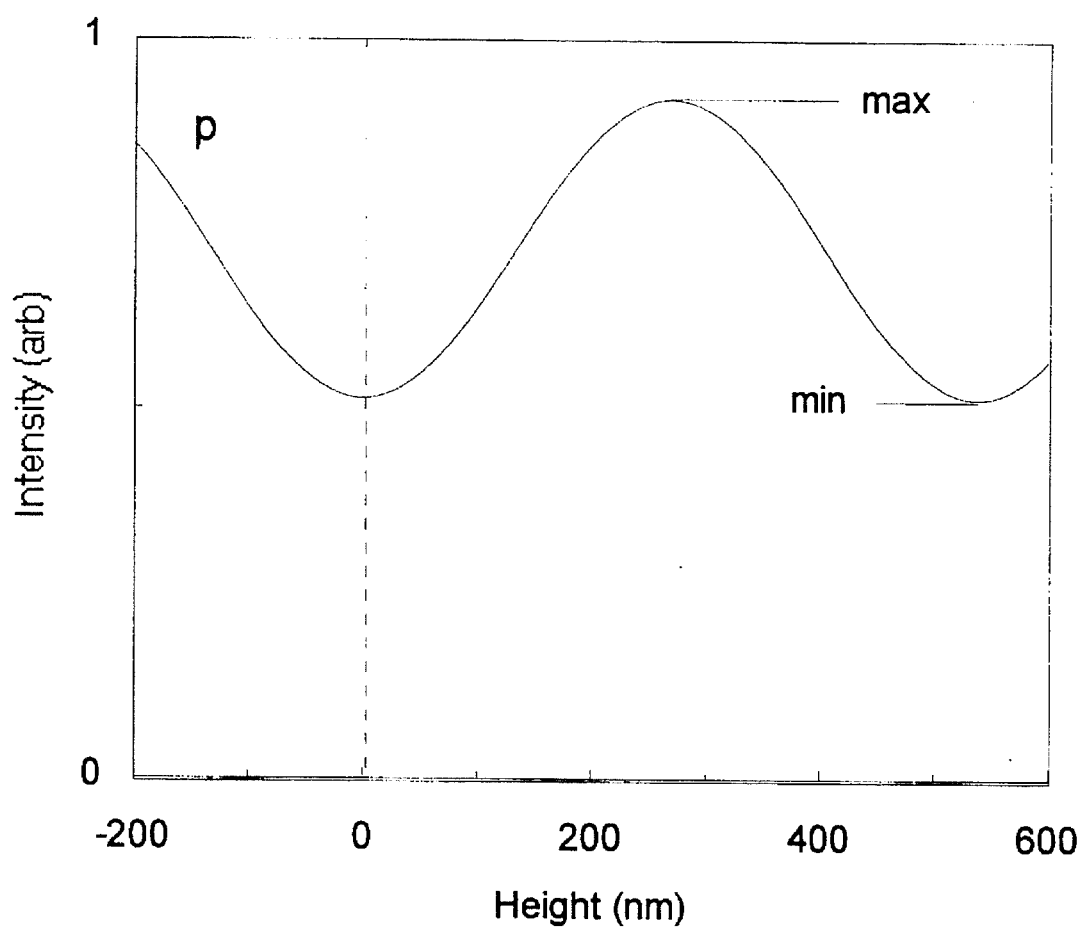
FIG. 6 is a graph showing the variation in the intensities for the p-polarization as a function of the size of the distance between two surfaces for $\phi=54°$, $n_g=1.55$, $n'=2.5$, $\lambda=633$ nm.

The variation in measured intensities as a function of the distance between surfaces 25 and 35 is depicted graphically in FIGS. 5 and 6.

Phase detector 13 preferably determines the difference in phase between the two polarizations s and p. This phase difference may be represented by the expression $$\theta(\beta) = arg[z_s(\beta)] - arg[z_p(\beta)] + \xi. \tag{9.}$$

where $$\xi = arg(a''_s) - arg(a''_p). \tag{10.}$$

Figure 7:
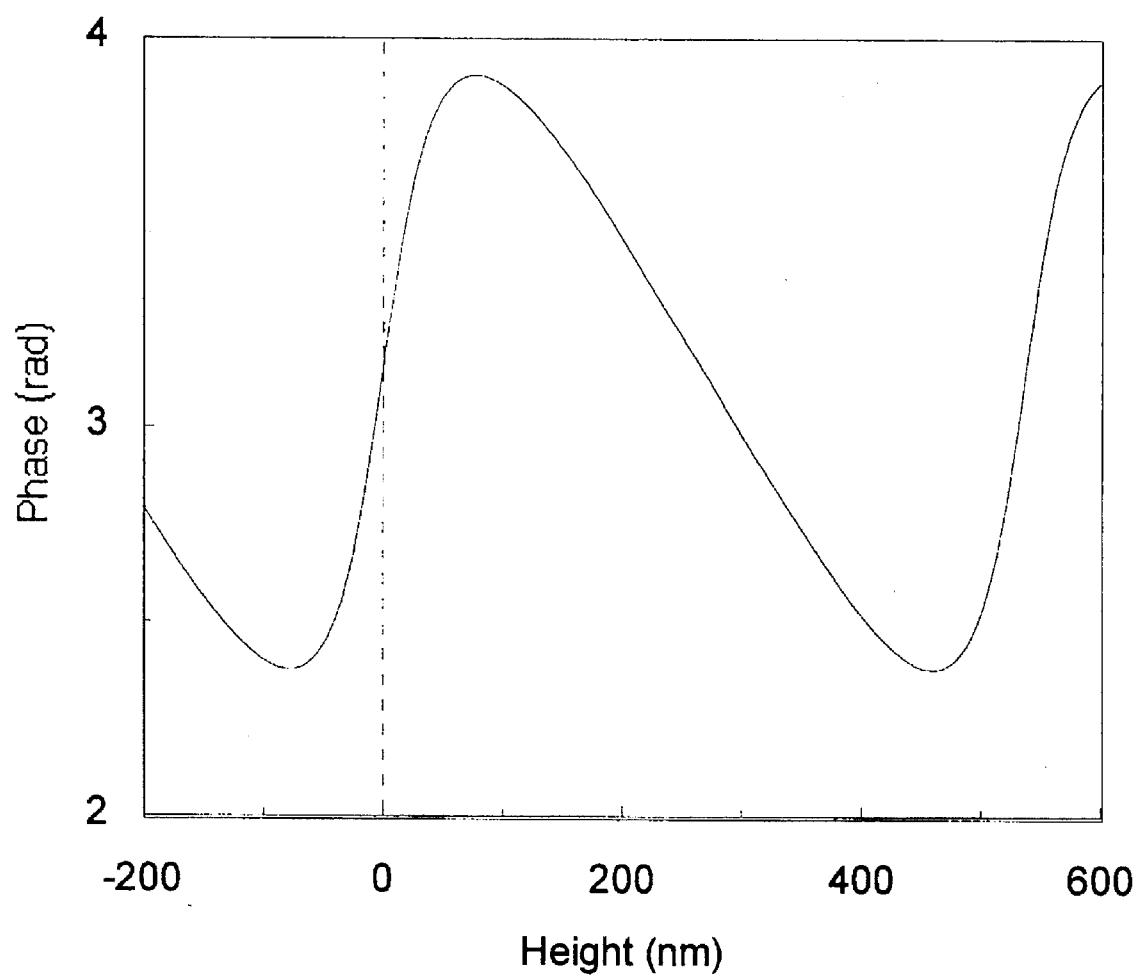
FIG. 7 is a graph showing the variation in the measured interferometric phase as a function of the size of the distance between two surfaces, for $\phi=54°$, $n_g=1.55$, $n'=2.5$, $\xi=0$, 680 =633 nm.

FIG. 7 depicts in graphical form the variation of the relative phase as a function of the distance between surfaces 25 and 35.

Phase detector 13 preferably functions by mathematical analysis of the intensities $I_{1...4}$ measured by photodetectors 121,122,131,132 shown in FIG. 3. The presently-preferred phase measurement method preferably requires that polarizing elements 120, 130 and waveplate 123 be so selected and arranged so that the four intensities $I_{1...4}$ correspond to a sequence of four interference signals separated in phase by exactly $\pi/2$ radians. It is then possible to extract the phase difference between the s and p polarizations by means of the formula $$\theta = \tan^{-1}\left(\frac{I_1 - I_3}{I_2 - I_4}\right) \tag{11.}$$

This formula is frequently referred to in the art as the "four step algorithm" for phase estimation (see for example p.511 of the book Optical Shop Testing, second edition, edited by Daniel Malacara (Wiley, New York, 1992)). Other known algorithms for phase estimation may also be used and are described in detail in the book Optical Shop Testing.

The intensities $I_{s,p}(\beta)$ and the phase $\theta(\beta)$ (see Eq.9) together preferably provide sufficient information to determine the distance h between surfaces 25 and 35 unambiguously, over a range defined by the expression $$0 \le \beta < 2\pi. \tag{12.}$$

Briefly explained, computer 99 preferably compares the measured values of $I_s$, $I_p$ and $\theta$ with the theoretical predictions (see Eqs.(6.) and (9.)) over a range $0 \le \beta < 2\pi$. The value of $\beta$ that provides the best possible match between theory and experiment is then preferably used to calculate the distance h (see Eq.(5.)). A highly advantageous aspect of the invention is that it preferably provides accurate measurements of the distance h all the way down to contact, for all materials, including dielectric materials. Prior art methods based on multiple-wavelength intensity measurements at normal incidence have very poor accuracy near contact, particularly with dielectric materials.

Those skilled in the art will appreciate that other measurement parameters related to the intensities $I_{s,p}(\beta)$ and the phase $\theta(\beta)$ may also be taken as the primary parameters for measurement and analysis. For example, the contrast of the interference phenomenon in phase detector 13 is equal to two times the square root of the product of the intensities $I_{s,p}(\beta)$. Also, the average of the intensities measured by the photodetectors 121, 122, 131, 132 (FIG. 3) is equal to the sum of the two intensities $I_{s,p}(\beta)$. An alternative embodiment of the invention therefore dispenses with the intensity meter 12 shown in FIG. 1 and in FIG. 3, and preferably relies entirely on data acquired with phase detector 13. The primary measurement parameters for this alternative embodiment are the relative phase, the average intensity and the fringe contrast.

The presently preferred embodiment of the invention also provides a method and means for determining the complex index of refraction of the surface 35. The method preferably involves varying the distance between the two surfaces 25,35 over a range corresponding to a variation in the quantity $\beta$ of at least $2\pi$. Referring again to FIG. 1, there is shown a mechanical arm 31 used to hold test object 30 against disk 20. Mechanical arm 31 is preferably actuated by a loading mechanism 32, such as is common in commercial flying-height test systems. In normal usage, loading mechanism 32 brings test object 30 nearly into contact with disk 20 by displacing it gradually from a distance greater than one wavelength of the source light along a direction substantially perpendicular to surface 25. This process is commonly referred to in the art as "loading". The preferred method of the present invention consists of preferably detecting and recording the maximum and minimum values of the following quantities during the process of loading test object 30 onto disk 20: the intensity of the p polarization, the intensity of the s polarization and the phase difference $\theta$ between these two polarizations. The maximum and minimum values acquired in this way may be represented by the symbols $I_{s,p}^{max}$, $I_{s,p}^{min}$, $\theta^{max}$, $\theta^{min}$. These values are preferably manipulated in computer 99 of FIG. 1 in order to determine the complex index of refraction n, in accordance with a mathematical procedure that will now be presented in detail.

Define two quantity $u_{s,p}$ as $$u_{s,p} = \frac{\sqrt{I_{s,p}^{max}} - \sqrt{I_{s,p}^{min}}}{\sqrt{I_{s,p}^{max}} + \sqrt{I_{s,p}^{min}}}. \quad (13.)$$

Further define two other quantities $\gamma_{s,p}$ by $$\gamma_{s,p}^2 = 4 R_{s,p} u_{s,p}^2 (1-R_{s,p})^2, \quad (14.)$$

where $R_{s,p}$ are the known reflectivities of surface 25. Now calculate the reflectivities of surface 35:

$$R_{s,p}' = \left[\frac{-u_{s,p}(1-R_{s,p}) \pm \gamma_{s,p}}{2\sqrt{R_{s,p}}}\right]^2 \quad (15.)$$

Next, calculate the phase difference $a_\Delta$ between the s and p polarizations from the formula $$a_\Delta = \frac{1}{2}(\theta^{max} + \theta^{min}). \quad (16.)$$

Now define a quantity $$\rho' = \sqrt{\frac{R_p'}{R_s'}} \exp(-i\alpha_\Delta) \quad (17.)$$

and calculate the complex index of refraction n' from the formula $$n' = \tan(\phi)\sqrt{1 - \frac{4\rho'}{(1+\rho')^2}\sin^2(\phi)}. \quad (18.)$$

The foregoing mathematical procedure for calculating the complex index n' of surface 35 assumes that the incident angle $\phi$ of beam 5 in FIG. 1 is close to but not equal to Brewster's angle for disk 20. A suitable angle for a disk index $n_g=1.5$ would, for example, be $\phi=52°$.

Preferably once the complex index of refraction has been determined, the complex reflectivities $r'_{s,p}$ of surface 35 may be calculated from the Fresnel equations $$r_s' = \frac{\tan(\phi - \bar{\phi})}{\tan(\phi + \bar{\phi})} \quad (19.)$$

$$r_p' = -\frac{\sin(\phi - \bar{\phi})}{\sin(\phi + \bar{\phi})} \quad (20.)$$

where $\phi$ is the angle of incidence, $\bar{\phi}$ is the (complex) angle of refraction, which may calculated from Snell's law of refraction:

$$n' \sin(\bar{\phi}) = \sin(\phi), \quad (21.)$$

Because the complex reflectivities $r'_{s,p}$ are known in the preferred method, there is no error in the gap measurement due to phase change on reflection.

Those skilled in the art will appreciate that several alternative embodiments of the present invention are possible without departing from the spirit of the invention. For example, an alternative embodiment of the invention for flying-height testing involves a substantially transparent surrogate slider flying on a real disk coated with magnetic media. In another embodiment, the transparent element comprises a plurality of surfaces to measure discontinuous features on an object or objects under test. In still another embodiment, the transparent element serves as a reference for profiling the object surface, which may be stationary or in motion in close proximity to the transparent element.

All of the embodiments benefit from the advantages of the disclosed invention, which include the ability to measures gaps with high sensitivity over a wide range using a single-wavelength source, the ability to measure very small gaps down to actual contact between the surfaces, the ability to measure and compensate for the complex index of refraction of the test object, and the insensitivity of the inventive apparatus to air currents and small mechanical distortions.

What is claimed is:

1. A method for measuring the distance of a surface of an object under test with respect to a surface of a substantially transparent element, said object surface being in close proximity to said transparent element surface, said method comprising the steps of:

directing a single polarized light beam toward said transparent element surface at an oblique angle, said single beam having a plane of incidence defining a polarization basis vector p having an associated orthogonal basis vector s, said single beam being incident on said transparent element surface and having a polarization such that both said s and p type polarizations are present;

reflecting said single light beam back through said substantially transparent element from said transparent element surface for providing a reflected beam comprising said s and p polarization components, said reflected beam resulting from a combined reflection from said substantially transparent element surface and said object surface, said reflected s and p polarization components having a relative phase with respect to each other and associated amplitudes;

interfering said reflected s and p polarization components in said reflected beam with each other for providing information about said relative phase and said associated amplitudes of said reflected s and p polarization components; and determining said distance based upon said relative phase and associated amplitude information of said reflected s and p polarization components.

2. A method for measuring the distance of a surface of an object under test with respect to a surface of a substantially transparent element in accordance with claim 1 wherein said surfaces are separated by a substantially transparent medium.

3. A method for measuring the distance of a surface of an object under test with respect to a surface of a substantially transparent element in accordance with claim 1 wherein said distance to be measured is less than one wavelength of the light comprising said light beam.

4. A method for measuring the distance of a surface of an object under test with respect to a surface of a substantially transparent element in accordance with claim 1 wherein the surface of said object under test is static relative to said transparent element surface.

5. A method for measuring the distance of a surface of an object under test with respect to a surface of a substantially transparent element in accordance with claim 1 wherein the surface of said object under test is moving relative to said transparent element surface.

6. A method for measuring the distance of a surface of an object under test with respect to a surface of a substantially transparent element in accordance with claim 1 further comprising the steps of:

varying the distance between said object surface and said transparent element surface over a range approximately substantially equal to or greater than the wavelength of the light comprising said light beam;

providing said amplitude and phase information while said distance is being varied for providing maximum and minimum values for said amplitude and phase information; and determining an effective complex index of refraction of the surface of the object under test based on said maximum and minimum values.

7. A method for measuring the distance of a surface of an object under test with respect to a surface of a substantially transparent element in accordance with claim 6 further comprising the step of storing said provided maximum and minimum values, said effective complex index of refraction being determined from said stored values.

8. A method for measuring the distance of a surface of an object under test with respect to a surface of a substantially transparent element in accordance with claim 1 further comprising the step of monitoring the position of said incident light beam on the surface of the object under test relative to the boundary of the surface of the object under test.

9. A method for measuring the distance of a surface of an object under test with respect to a surface of a substantially transparent element in accordance with claim 8 wherein said monitoring step comprises the steps of:

providing a second light source through a microscope toward said transparent element surface substantially at normal incidence;

reflecting said light provided through said microscope from said transparent element surface and said surface of the object under test and imaging said reflected light onto a camera means for enabling the boundary of the surface of the object under test to be viewed;

imaging at least a portion of said incident light beam onto said camera through said microscope for enabling the position of the incident beam on the surface of the object under test to be viewed; and viewing the position of said imaged incident light beam with respect to the boundary of the surface of the object under test.

10. A method for measuring the distance of a surface of an object under test with respect to a surface of a substantially transparent element in accordance with claim 1 wherein said relative phase difference is represented by the expression $\theta(\beta)=\arg[z_s(\beta)]-\arg[z_p(\beta)]+\xi$ where $z_{s,p}(\beta)$ are the effective reflectivities of the object under test and the transparent element surface taken together, and where $\xi=\arg(a''_s)-\arg(a''_p)$, where $a''_{s,p}$ are the electric field components of the incident beam for the s and p polarizations, and where $\beta=2kh\cos(\phi)$, where k is the angular wavenumber of the source light, $\phi$ is the angle of incidence, and h is the distance of the object under test with respect to the transparent element surface.

11. A method for measuring the distance of a surface of a substantially transparent object under test with respect to a surface of a substantially non-transparent element, said object surface being in close proximity to said non-transparent element surface, said method comprising the steps of:

directing a single polarized light beam toward said surface of said substantially transparent object under test at an oblique angle, said single beam having a plane of incidence defining a polarization basis vector p having an associated orthogonal basis vector s, said single beam being incident on said transparent object surface and having a polarization such that both said s and p type polarizations are present;

reflecting said single light beam back through said substantially transparent object under test from said object surface for providing a reflected beam comprising said s and p polarization components, said reflected beam resulting from a combined reflection from said substantially transparent object surface and said non-transparent element surface, said reflected s and p polarization components having a relative phase with respect to each other and associated amplitude;

interfering said reflected s and p polarization components in said reflected beam with each other for providing information about said relative phase and said associated amplitudes of said reflected s and p polarization components; and determining said distance based upon said relative phase and associated amplitude information of said reflected s and p polarization components.

12. A method for measuring the distance of a surface of a substantially transparent object under test with respect to a surface of a substantially non-transparent disk in accordance with claim 11 wherein said disk comprises a rotating magnetic storage medium and said object under test comprises a slider over said surface of said rotating magnetic storage medium; whereby aerodynamic flight characteristics of said slider over said transparent element surface may be predicted.

13. A method for measuring the distance of a surface of a substantially transparent object under test with respect to a surface of a substantially non-transparent element in accordance with claim 11 wherein said distance to be measured is less than one wavelength of the light comprising said light beam.

14. An apparatus for measuring the distance of a surface of an object under test with respect to a surface of a substantially transparent element, said object surface being in close proximity to said transparent element surface, said apparatus comprising:

means for providing a single polarized incident light beam toward said transparent element surface at an oblique angle with a plane of incidence which defines a polarization basis vector p to which is associated an orthogonal basis vector s, said polarized light beam polarization being such that both said s and p type polarizations are present, said single light beam being reflected back through said transparent element from said substantially transparent element surface as a reflected beam comprising reflected s and p polarization components and having a combined reflectivity of said transparent element and object surfaces, said combined reflectivity being dependent upon the polarization state of said single incident light beam and resulting in a change in the relative phases of said s and p polarization components and the amount of light in each polarization component of said single beam as a function of the separation between said surfaces;

means for mixing said reflected beam s and p polarization components of said single beam for providing an interference effect characteristic of the relative intensities of said s and p polarization components and the phase difference between said s and p polarization components and for providing information comprising said phase difference and said intensities; and means for determining said distance based upon said information comprising said phase difference and said intensities of said s and p polarization components; whereby high-speed, high-precision measurement of the distance between the surface of an object under test and the surface of substantially transparent element may be accomplished.

15. An apparatus for measuring the distance of a surface of an object under test with respect to a surface of a substantially transparent element in accordance with claim 14 wherein said means for mixing said reflected beam polarization components and for providing said information comprises a polarizing element for mixing said polarization components.

16. An apparatus for measuring the distance of a surface of an object under test with respect to a surface of a substantially transparent element in accordance with claim 15 wherein said polarizing element comprises a Wollaston prism-like means.

17. An apparatus for measuring the distance of a surface of an object under test with respect to a surface of a substantially transparent element in accordance with claim 15 wherein said means for mixing said reflected beam polarization components and for providing said information further comprises photodetector means for measuring said intensities.

18. An apparatus for measuring the distance of a surface of an object under test with respect to a surface of a substantially transparent element in accordance with claim 17 wherein said means for mixing said reflected beam polarization components and for providing said information further comprises means for shifting the relative phase of said s and p polarization components and means for mixing said phase shifted polarization components into a pair of beams orthogonally polarized with respect to each other for providing an interference effect characteristic of the relative intensities of said two polarizations.

19. An apparatus for measuring the distance of a surface of an object under test with respect to a surface of a substantially transparent element in accordance with claim 18 wherein said means for mixing said reflected beam polarization components and for providing said information further comprises photodetector means for measuring the intensities of said mixed phase shifted polarization components.

20. An apparatus for measuring the distance of a surface of an object under test with respect to a surface of a substantially transparent element in accordance with claim 19 wherein said means for mixing said reflected beam polarization components and for providing said information comprises polarization sensitive intensity meter means for measuring the amount of light in each polarization in said reflected beam, phase detector means for determining the difference in phase between said s and p polarizations, and beam splitter means for dividing said reflected beam into two beams, one of said two beams being directed to said polarization sensitive intensity meter means and the other of said two beams being directed to said phase detector means, said phase detector means comprising said polarizing element, said photodetector means, and said phase shifting means.

21. An apparatus for measuring the distance of a surface of an object under test with respect to a surface of a substantially transparent element in accordance with claim 14 wherein said means for mixing said reflected beam polarization components and for providing said information comprises polarization sensitive intensity meter means for measuring the amount of light in each polarization in said reflected beam, phase detector means for determining the difference in phase between said s and p polarizations, and beam splitter means for dividing said reflected beam into two beams, one of said two beams being directed to said polarization sensitive intensity meter means and the other of said two beams being directed to said phase detector means.

22. An apparatus for measuring the distance of a surface of an object under test with respect to a surface of a substantially transparent element in accordance with claim 14 further comprising microscope means disposed with respect to said object surface for determining the position of the measurement point on the surface of said object under test.

23. An apparatus for measuring the distance of a surface of an object under test with respect to a surface of a substantially transparent element in accordance with claim 14 wherein said means for providing said polarized incident light beam comprises a light source and a polarizing element through which the light from said light source is directed.

24. An apparatus for measuring the distance of a surface of an object under test with respect to a surface of a substantially transparent element in accordance with claim 23 wherein said polarizing element comprises a dichroic linear polarizer like means.

25. An apparatus for measuring the distance of a surface of an object under test with respect to a surface of a substantially transparent element in accordance with claim 23 wherein said light source comprises laser means.

26. An apparatus for measuring the distance of a surface of an object under test with respect to a surface of a substantially transparent element in accordance with claim 23 wherein said light source comprises light emitting diode means.

27. An apparatus for measuring the distance of a surface of an object under test with respect to a surface of a substantially transparent element in accordance with claim 23 wherein said light source comprises discharge lamp means.

28. An apparatus for measuring the distance of a surface of a substantially transparent object under test with respect to a surface of a substantially non-transparent element, said object surface being in close proximity to said non-transparent element surface, said apparatus comprising:

means for providing a single polarized incident light beam toward said surface of said substantially transparent object under test at an oblique angle with a plane of incidence which defines a polarization basis vector p to which is associated an orthogonal basis vector s, said single polarized light beam polarization being such that both said s and p type polarizations are present, said single light beam being reflected back through said substantially transparent object under test from said object surface as a reflected beam comprising reflected s and p polarization components and having a combined reflectivity of said transparent object and non-transparent element surfaces, said combined reflectivity being dependent upon the polarization state of said single incident light beam and resulting in a change in the relative phases of said s and p polarization components and the amount of light in each polarization component of said single light beam as a function of the separation between said surfaces;

means for mixing said reflected beam s and p polarization components of said single beam for providing an interference effect characteristic of the relative intensities of said polarization components and the phase difference between said s and p polarization components and for providing information comprising said phase difference and said intensities; and means for determining said distance based upon said information comprising said phase difference and said intensities of said s and p polarization components; whereby high-speed, high-precision measurement of the distance between the surface of said substantially transparent object under test and the surface of a substantially non-transparent element may be accomplished.

29. An apparatus for measuring the distance of a surface of a substantially transparent object under test with respect to a surface of a substantially non-transparent element in accordance with claim 28 wherein said non-transparent element comprises a rotating magnetic storage medium and said test object comprises a slider over said surface of said rotating magnetic storage medium.

\* \* \* \* \*